May 17, 1966 W. B. HULL 3,251,935

MAGNETIC TAPE EDITING APPARATUS

Filed Aug. 2, 1962 4 Sheets-Sheet 1

INVENTOR.

WILLIAM B. HULL

BY Bosworth, Sessions, Herrstrom & Knowles

ATTORNEYS.

May 17, 1966 W. B. HULL 3,251,935

MAGNETIC TAPE EDITING APPARATUS

Filed Aug. 2, 1962 4 Sheets-Sheet 2

INVENTOR.
WILLIAM B. HULL
BY Bosworth, Sessions, Herrstrom & Knowles
ATTORNEYS.

INVENTOR.
WILLIAM B. HULL
BY Bosworth, Sessions, Herrstrom & Knowles
ATTORNEYS.

MAGNETIC TAPE EDITING APPARATUS

Filed Aug. 2, 1962

4 Sheets-Sheet 4

INVENTOR.
WILLIAM B. HULL
BY Bosworth, Sessions, Herrstrom & Knowles
ATTORNEYS.

United States Patent Office 3,251,935
Patented May 17, 1966

3,251,935
MAGNETIC TAPE EDITING APPARATUS

William B. Hull, North Royalton, Ohio, assignor to Storer Broadcasting Company, Miami Beach, Fla., a corporation of Ohio Filed Aug. 2, 1962, Ser. No. 214,370
10 Claims. (Cl. 178—6.6)

This invention relates to the handling of magnetic tape having signals magnetically recorded thereon and, in particular, to a method and apparatus for editing information magnetically recorded on such tape by selectively cutting and splicing the tape.

My invention is especially useful in the editing of program material magnetically recorded on magnetic tapes as used in television broadcasting and systems and commonly known as "video tape." Such video tape is widely used in the television industry today for magnetically recording program material. The program material may be classified as picture information and as sound information, each of which is recorded in a more or less continuous fashion along the length of the tape in different tracks or channels spaced apart across the width of the tape. There is also magnetically recorded on the tape generally simultaneously with the picture and sound information a separate control signal known as the control track. The control track is generally recorded near one longitudinal edge of the tape and is made up of signals which function primarily to maintain synchronism between the tape playback equipment and home television receivers. The program material and control track recorded on the tape are, of course, not themselves visible to the eye.

For various and obvious reasons, it is frequently and commonly necessary to selectively edit the recorded program material by cutting the tape, rearranging, adding and/or deleting lengths of tape and finally splicing together the cut ends of the edited tape to provide a continuous tape upon which the previously recorded program material occurs in the desired amount and sequence. When joining together two ends of recorded video tape, it is necessary that the synchronizing signals in the control track of the two pieces to be joined be accurately related to each other and maintained in the regular and prescribed pattern if the video synchronism is to be maintained when the splice is run through playback equipment. Tape having a splice wherein the control track pattern is disrupted will produce a momentary tearing of the picture on the home receiver as the splice passes through the playback equipment and until their synchronism is restored.

The control track consists primarily of a plurality of uniformly spaced control pulses. In addition, edit pulses or signals are provided in the control track at regularly and uniformly spaced intervals as for example at every eighth control pulse as an aid in accurately relating the control tracks of two pieces of recorded video tape. These edit pulses are relatively narrow as measured longitudinally of the tape so that they indicate a point along the length of the tape with considerable precision. Also, they are peaked so as to occupy a greater portion of the transverse width of the magnetic tape and, therefore, they can be sensed separately from the control pulses of the control track by appropriately locating a playback head along that part of the transverse width of the tape at which they are recorded. Splicing of recorded video tape that is accurate with respect to the interval between control pulses of the control track can, therefore, be accomplished by trimming the ends of two pieces of tape to be spliced with reference to an edit pulse on each of the two pieces to be joined.

The quality of the splice from the standpoint of spacing of the control track control pulses depends, therefore, upon the precision with which the cuts in the tape are made with respect to the location of the control track edit pulses. Since the material magnetically recorded on the video tape is invisible, the edit pulses must be sensed and their location with respect to a reference displayed in a sensible manner.

One of the objects of my invention, therefore, is to provide a method of and apparatus for longitudinally positioning with respect to each other two longitudinally aligned pieces of magnetic tape having recorded thereon similar control tracks of uniformly spaced control pulses so that the two pieces of tape may be joined together to form a continuous piece of tape having recorded thereon a continuous control track in which the regular and uniform spacing of the control pulses thereof is maintained across the splice or joint.

A further object is to provide a method of and apparatus for longitudinally relating one of two pieces of such tape with respect to the other so that an edit pulse on one piece of tape and an edit pulse on the other piece of tape are longitudinally spaced apart from each other a whole number multiple of the spacing of the edit pulses in the recorded control tracks on the two pieces of tape.

Another object of my invention is to provide an apparatus for simultaneously sensing and producing a sensible indication of the location of an edit pulse on each of the two pieces of such magnetic tape with respect to each other.

Another object is to provide apparatus for longitudinally positioning one of two such pieces of tape with respect to the other in accordance with such simultaneous sensible indications so that the continuity and pattern of spacing of the control track pulses are maintained from one piece of tape to the other.

Another object is to provide apparatus for so positioning two pieces of such prerecorded tape longitudinally with respect to each other and for trimming the adjacent ends of two pieces of tape so that they may be abutted and joined while preserving the continuity and pattern of spacing of the control track pulses recorded on the two pieces of tape across the joint therebetween.

The manner and means by which I accomplish the foregoing objects as well as other objects and advantages as may appear are set forth in the following description of a preferred form of my invention taken together with the accompanying drawings in which.

Figure 2:
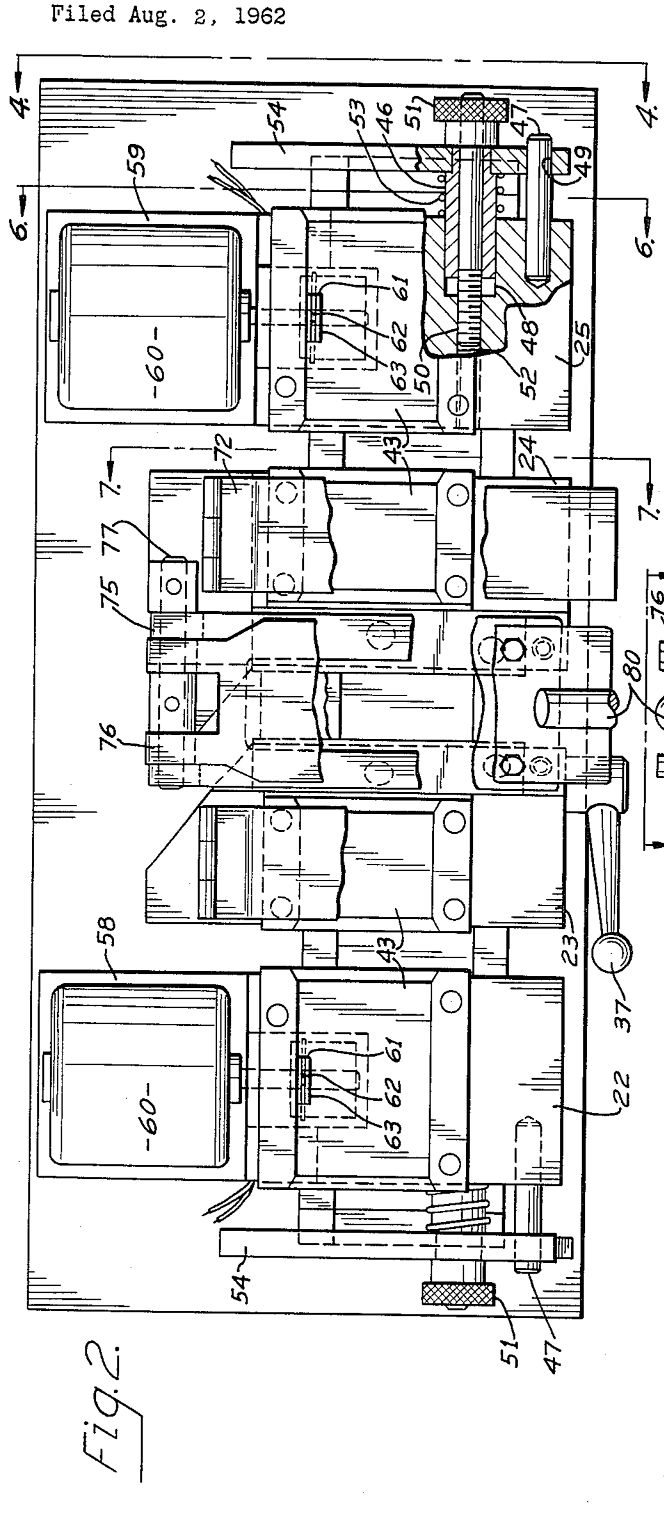
FIGURE 2 is a top plan elevation view of the apparatus shown in FIGURE 1 with certain portions thereof shown in cross section and other parts broken away.
Figure 5:
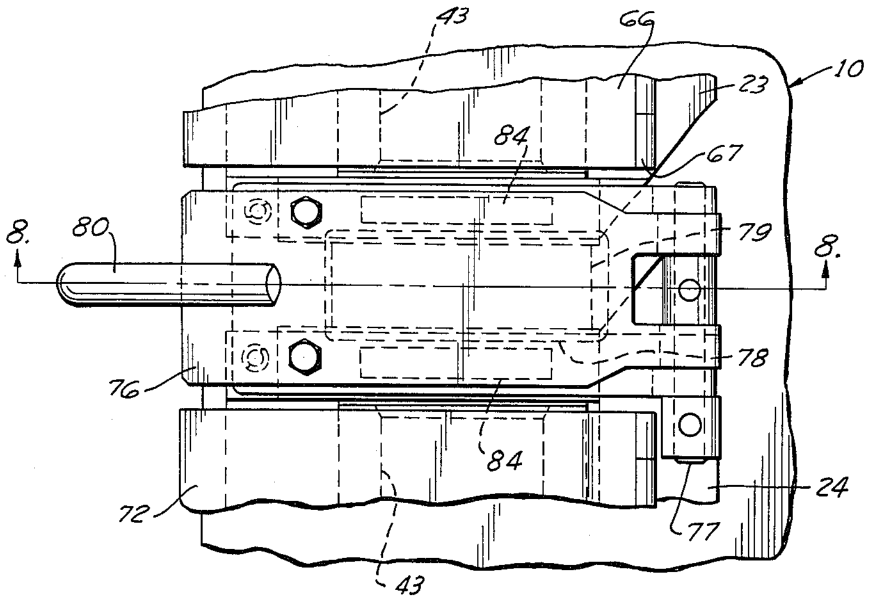
FIGURE 5 is a top elevation view on an enlarged scale of a central portion of the apparatus of FIGURE 1 and showing in full its parts broken away in FIGURE 2.
Figures 6, 7, 8:
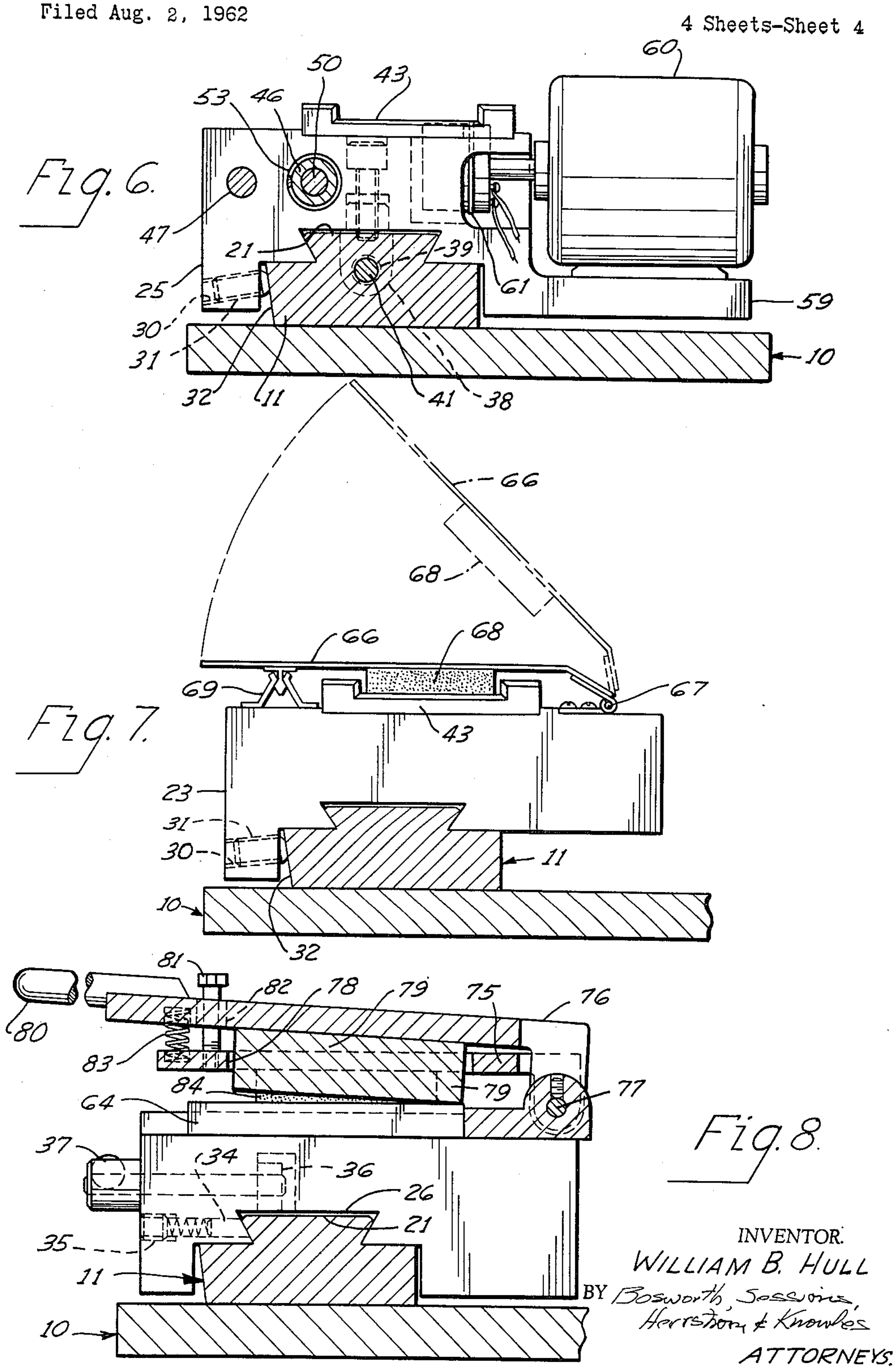

FIGURES 6 and 7 are cross-sectional views taken in vertical planes through lines 6—6 and 7—7, respectively, of FIGURE 2; and FIGURE 8 is a cross-sectional view taken in the vertical plane through line 8—8 of FIGURE 5.

Figure 1:
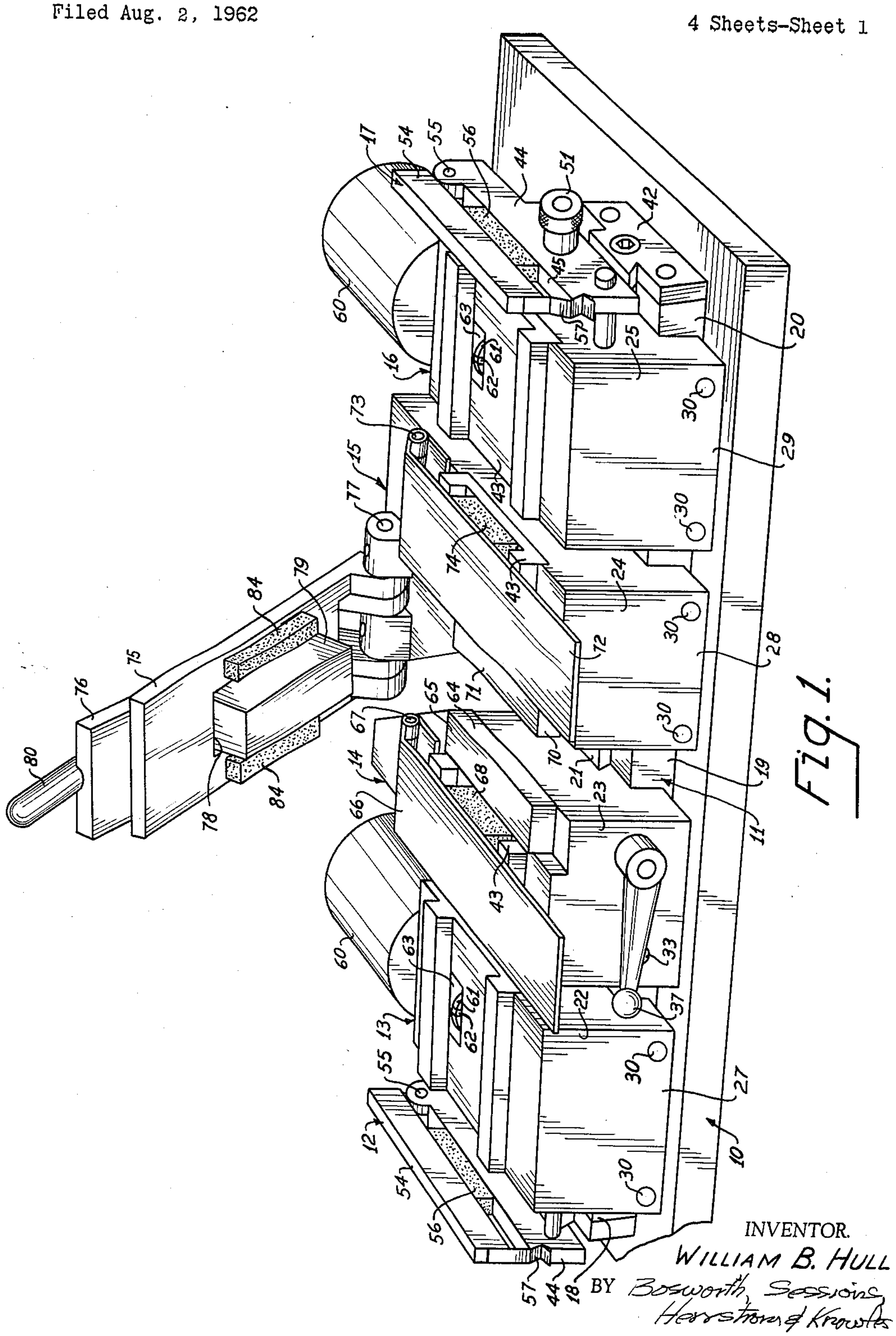
FIGURE 1 is an isometric view of a preferred form of apparatus embodying my invention.
Figure 3:
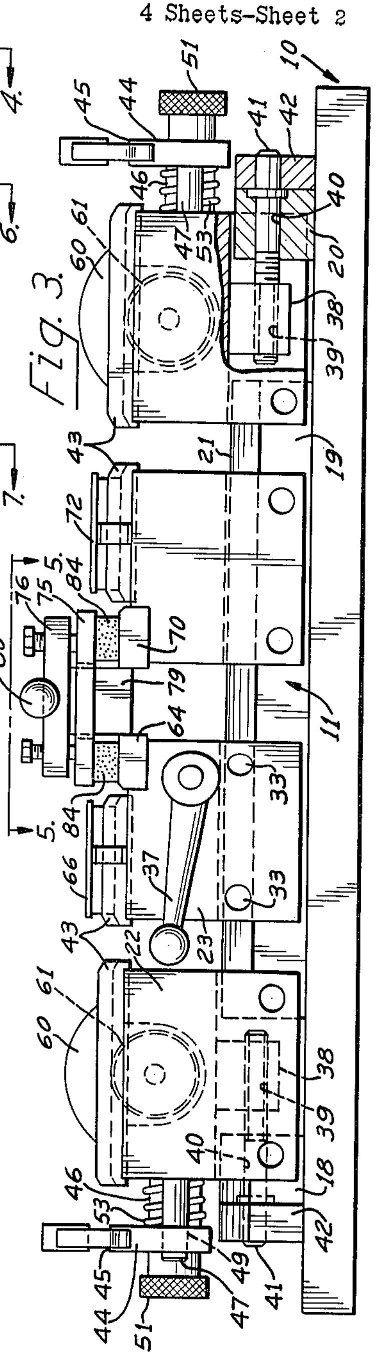
FIGURE 3 is a side elevation view of the apparatus shown in FIGURE 1.
Figure 4:
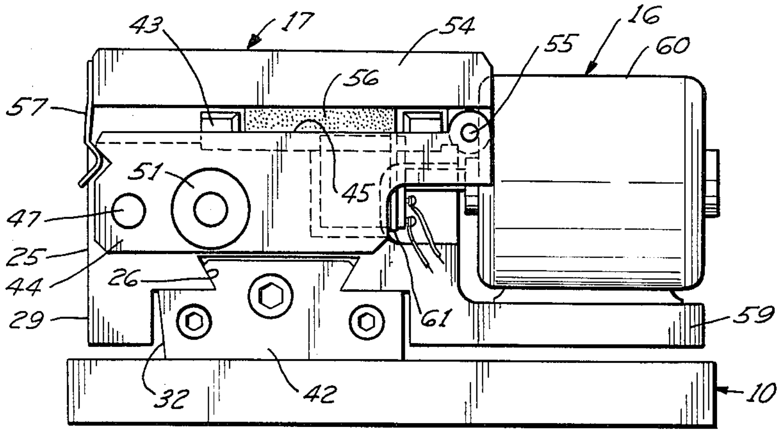
FIGURE 4 is an elevation view of the right-hand end of the apparatus as seen in FIGURE 1.

The preferred embodiment of the apparatus of my invention as shown in the several overall views of FIGURES 1–3 and in the several partial views of FIGURES 4–8 comprises the following major component parts, each generally indicated by their respective references: base 10, supporting and guiding bed 11, left-hand tape positioner 12, left-hand pulse sensing element 13, left-hand tape holder and cutting edge 14, right-hand tape holder and cutting edge 15, right-hand pulse sensing element 16 and right-hand tape positioner 17. The left- and right-hand designations applied to the components above and as used throughout the description of the apparatus below refer to the various parts and elements so designated as they are shown in FIGURES 1–3 and as they would appear to one operating the apparatus.

Supporting and guiding bed 11 consists of three longitudinally aligned and spaced apart parts, i.e. left-hand portion 18, central portion 19 and right-hand portion 20, all securely fastened in any suitable manner to base 10. Bed 11 is provided along the upper surfaces of its various parts with an upwardly and outwardly flaring tenon 21 extending longitudinally of bed 11 and as clearly shown in transverse cross section in FIGURES 6–8.

Each of the major component parts 13, 14, 15 and 16 includes a carriage portion 22, 23, 24 and 25, respectively, and all are provided on their lower side with a mortise 26 having a close sliding dovetail fit with tenon 21 so that the carriages and their respective components may be positioned on and along bed 11 and maintained in longitudinal alignment in their several positions by tenon 21.

A lower side portion 27, 28 and 29, depends from carriage portions 22, 24 and 25, respectively, through each of which is provided a pair of tapped bores 30 extending in a direction generally normal to the longitudinal axis of mortise 26. Clamping studs 31 are turned into bores 30 and engage a slightly inclined side wall 32 of bed 11 for clamping each of the carriage parts 22, 24 and 25 to bed 11 at any desired position therealong.

Carriage part 23 of left-hand tape holder and cutting edge 14 is provided with a pair of tapped bores 33 extending through one side thereof in a direction generally normal to the longitudinal axis of mortise 26 and vertically opposite one of the inclined side walls thereof. A spring-loaded detent 34 maintained in place by a turned-in cap 35 extends outwardly of one end of each of tapped bores 33 and into engagement with one of the inclined side walls of tenon 21 so as to yieldingly urge the opposite inclined side wall of tenon 21 and its mating wall of mortise 26 into tighter engagement similar to that produced between the corresponding tenon and mortise walls in carriage parts 22, 24 and 25 by clamping studs 31. Spring-loaded detents 34 do not prevent the sliding of carriage 23 on and along bed 11. Carriage 23 may be locked to bed 11 at any preselected point therealong by means of an eccentric cam 36 rotatable by means of handle 37 on the forward side of carriage part 23 into and out of engagement with the top surface of tenon 21 as shown in FIGURE 8.

In addition to the various clamping means noted above, carriage parts 22 and 25 of pulse sensing elements 13 and 16, respectively, are also provided with fine adjustment means for accurately positioning them along bed 11. The positioning means for each carriage comprises a lug 38 depending from the central portion of mortise 26 and extending downwardly and between the spaced apart ends of bed portions 18, 19 and 20 revealed in the sectioned part of right-hand pulse sensing element 16 in FIGURE 3 and further as shown in broken outline in FIGURE 6. Each lug 38 is provided with a tapped bore 39 extending longitudinally and parallel to the axis of tenon 21. A bore 40 is provided in left-hand part 18 and right-hand part 20 of bed 11 extending longitudinally of the bed and in alignment with tapped bores 39 in lugs 38. An adjusting screw 41 extends through each of bores 40 and is turned into tapped bores 38. Adjusting screws 41 each have an annular shoulder received in a counterbore of bore 40 and confined therein by bed end plates 42 with one end of the adjusting screw extending therethrough. Thus, adjusting screws 41 are prevented any axial movement relative to bed 11 so that when they are turned into and out of tapped bores 39 in lugs 38, they move their respective pulse sensing elements back and fourth along bed 11.

It will be apparent from the foregoing that left-hand pulse sensing element 13, left-hand tape holder and cutting edge 14, right-hand tape holder and cutting edge 15 and right-hand pulse sensing element 16 are lined up on and along a common path or axis, i.e. tenon 21 of bed 11 and may be shifted to various positions along this axis at which they may be maintained by clamping means.

The upper face opposite the lower face containing mortise 26 of each of carriage parts 22, 23, 24 and 25 is provided with a guideway element 43 having parallel and laterally spaced apart upstanding side walls and a plane surface extending between them. Guideway elements 43 are arranged with their corresponding side walls in axial alignment with each other and the axis of tenon 21 and with their adjacent ones of their open ends facing each other so that together they provide a discontinuous and straight guideway adapted to receive a piece or pieces of magnetic tape lying flat along the plane surface bottom and held laterally by the upstanding side walls. The side walls of guideway elements 43 are, of course, spaced apart the distance only enough greater than the width of the tape to be used in the apparatus to provide for a close sliding fit of the tape therein. It is also necessary that guideway elements 43 and, indeed, any of the parts with which recorded magnetic tape may have contact and especially relative motion, be fabricated of some non-magnetic material as, for example stainless steel.

The tape positioners 12 and 17 are mounted on and for movement relative to pulse sensing elements 13 and 16, respectively, and each consists of a relatively thin vertically standing body 44 having a top edge surface 45 in vertical alignment with the bottom surface of and opposite the one open end of the guideway element 43 in its associated pulse sensing element. Each body 44 is mounted for movement toward and away from its associated pulse sensing element with its top edge surface 45 maintained in planar alignment with guideway 43 of the bottom surface by means of a pair of guide pins 46 and 47 and guide pin holes 48 and 49. One end of guide pins 46 is provided with a reduced outside diameter forming an annular radially extending shoulder and which is received with a press fit into a hole in body 44. Guide pins 46 have an axial bore in which is received an adjusting screw 50 provided with a knurled knob 51 which may be turned into and out of a tapped bore 52 in the bottom of guide pin hole 48 in the carriage element to draw body 44 toward the carriage element or permit it to be pushed away by compression spring 53 surrounding each guide pin 46. Guide pins 47 are press fitted into suitable bores in the carriage portions and have a sliding fit with guide pin holes 49 in bodies 44.

Both left- and right-hand tape positioners 12 and 17, respectively, are provided with transversely extending clamping bars 54 lying above and slightly spaced from the top edge surfaces 45 of body parts 44 and pivotally connected as at 55 to the rear portions of body elements 44. The undersides of clamping bars 54 are provided with resilient pressure pads 56 which yieldingly engage top surface 45 when clamping bars 54 are latched by spring latches 57 on the forward side of body portions 44 and as shown in FIGURE 1. It will be apparent that when a piece of magnetic tape is led over the top edge surface 45 of body portion 44 of one of the tape positioners and its clamping bar 54 lowered and spring-latched with pressure pad 56 resiliently urged against the tape that movement of the tape positioner with respect to its associated pulse sensing element will longitudinally displace the tape clamped therein relative to the pulse sensing element.

Referring now more particularly to the pulse sensing elements 13 and 16, each carriage portion 22 and 25 thereof has a rearwardly extending shelf portion 58 and 59, respectively, on each of which is mounted a synchronous motor 60 which drives a rotating playback head 61 mounted on its shaft. The playback heads 61 are relatively thin discs provided at one or more points along their periphery with any suitable and conventional means for sensing and converting into an electrical signal magnetically recorded signals on a magnetic tape upon relative movement between the electromagnetic element and the tape as, for example, a variable reluctance electromagnetic element. I prefer that both motors operate at the same speed such as 1800 r.p.m. and that each rotating playback head 61 be provided with a single electromagnetic sensing element 62 at a point in its periphery. The electrical signals produced by electromagnetic elements 62 are taken off rotating playback heads 61 by means of conventional slip rings and brushes (not shown).

The guideway elements 43 of pulse sensing elements 13 and 16 overlie playback heads 61 and are provided with longitudinal slots 63 generally adjacent one side wall thereof in which appears the peripheral portion of the rotating playback heads 61. When a recorded magnetic tape is positioned in guideways 43, it lies tangent to rotating playback heads 61 and is positioned closely to but slightly spaced from the heads 61 at its point of tangency therewith and in accordance with conventional magnetic tape recording and playback practice. Slots 63 in guideways 43 are located at a point across the width of the guideways corresponding to the location on the tape of the magnetically recorded pulses desired to be sensed. In connection with video tape having video, audio and control information arranged thereon as explained above, slots 63 are located and rotating playback heads 61 appear therein near a longitudinal edge of guideways 43 corresponding to the location of the upper or extended sharp peaks of the edit pulses.

Left- and right-hand tape holders and cutting edge elements 14 and 15, respectively, together comprise means for holding each of two pieces of longitudinally aligned tape and for shearing their adjacent ends transversely and square with respect to the parallel longitudinal sides of the tape pieces.

More particularly, left-hand tape holder element 14 is provided with a stationary cutting block 64 of non-magnetic material suitably fastened in a recess in the upper right-hand side of carriage portion 23. The upper surface 65 of cutting block 64 is mounted flush with the bottom surface of adjacent guideway 43. A clamping plate 66 is pivotally connected as at 67 to the back side of carriage portion 23 for swinging motion in a vertical plane and transversely overlies and swings down upon guideway 43. Clamping plate 66 is provided with a resilient pressure pad 68 on that portion of its undersurface adjacent and between the side walls of guideway 43 and with a spring catch 69, seen in FIGURE 7, for holding the clamping plate 66 in its clamping position with pressure pad 68 yieldingly urged against the bottom surface of guideway 43.

Right-hand tape holder and cutting edge 15 is similarly provided with a stationary cutting block 70 of non-magnetic material suitably mounted in a recess on the upper and left-hand side of carriage part 24 with its upper surface 71 flush with the bottom surface of guideway 43. A clamping plate 72, similar to plate 66, is pivotally connected to carriage portion 24 as at 73 and is provided with a resilient pressure pad 74 and a spring catch for holding clamping plate 72 in a generally horizontal position with pressure pad 74 urged against the bottom surface of guideway 43.

Also mounted on the right-hand tape holder and cutting edge element 15 is a cooperating clamping plate 75 and cutter bar 76 mounted together on a common hinge pin 77 for swinging movement in a substantially vertical plane on the rear and leftwardly extending portion of carriage element 24. Clamping plate 75 underlies cutter bar 76 and is provided with a central opening 78 through which projects a movable cutting block 79 carried by cutter bar 76 for shearing cooperation with stationary cutting blocks 64 and 70. As seen in FIGURE 8, when cutter bar 76 is raised from the position shown by means of handle 80 mounted thereon, clamping plate 75 is also raised because of a lost motion connection between it and cutter bar 76 comprising a bolt 81 mounted in clamping plate 75 and passing through an oversized hole 82 in cutter bar 76. In addition, a compression spring 83 is positioned between the oppositely located counterbores in clamping plate 75 and cutter bar 76 so that when cutter bar 76 is lowered, clamping plate 75 will swing downwardly with it and be resiliently urged toward and with pressure pads 83 located on opposite sides of central opening 78 engaging the top surfaces 65 and 71 of cutting blocks 64 and 70, respectively. The lost motion connection permits cutter bar 76 and its cutting block 79 to travel a limited distance while clamping plate 75 remains stationary so as to complete a shearing operation between the left-hand bottom edge of cutting block 79 and the right-hand upper cutting edge of cutting block 64 and the right-hand lower cutting edge of cutting block 79 and the upper left-hand cutting edge of cutting block 70.

Thus, left- and right-hand tape holders and cutting edge elements 14 and 15 together provide means for easily and simply shearing the ends of two pieces of tape longitudinally aligned and held therein along the adjacent cutting edges of their respective stationary cutting blocks 64 and 70 through operation of cutter bar 76. Clamping plate 75 cooperating with cutter bar 76 insures that the tape is resiliently urged into and maintained in complete contact across its transverse width with the upper surfaces 65 and 71 of cutting blocks 64 and 70, respectively, during the shearing operation.

When shearing tapes by operation of cutter bar 76, left-hand tape holder and cutting edge element 14 should be positioned with respect to right-hand tape holder and cutting edge element 15 by lowering cutter bar 76 until cutting block 79 carried thereon lies between at least a portion of cutting blocks 64 and 70 whereupon the position of left-hand tape holder and cutting edge element 14 is adjusted and clamped by operation of eccentric cam 36 through handle 37 to bed 11 in a position to insure good shearing action between cutting blocks 64 and 79.

When the end of two tapes held in left- and right-hand tape holders and cuttting edge elements 14 and 15, respectively, are simultaneously sheared by operation of cutter bar 76, the sheared ends will be spaced and held apart a distance equal to the width of movable cutting block 79 on cutting bar 76. As will become more clear in connection with the following description of the operation of the apparatus embodying my invention, I prefer that the width of movable cutting block 79 and thus the space between the simultaneously sheared ends of two pieces of tape be equal to the spacing between two edit pulses in the control track of the tape being edited or equal to a whole number multiple of the spacing between two such edit pulses.

It will be noted that in the drawing, the cutting edges of the stationary and movable cutting blocks are oriented at right angles with respect to the longitudinal axis of the apparatus passing through the guideways. My invention also comprehends other angular relationships between the cutting edges and longitudinal axis of the apparatus so that operation of the movable cutting block will shear the tape along a line related to its longitudinal axis by some particular angle other than 90°. It is desirable, for example, when editing and splicing conventional video tape by means of the apparatus of my invention that the cutting edges of the movable and stationary cutting blocks be skewed with respect to the longitudinal axis of the tape. Such a relationship is desirable because of the manner in which the various signals are recorded on the tape. Conventionally, for example, during recording, the tape is moved along a linear path in one direction while the recording heads are moved transversely of the tape in a linear direction normal to the path of travel of the tape.

Simultaneously occurring video, audio and control signals thus appear in alignment across the width of the tape and along a line slightly skewed from the normal to the path of travel of the tape being recorded. Ideally then, the cutting edges of the movable and stationary cutting blocks should be skewed with respect to the longitudinal axis of the apparatus in this amount so that the tape will be skewed along the line of simultaneously occurring signals.

Conventionally, this angle is 33′ plus or minus 3′ from the normal to the longitudinal axis of the apparatus.

It is to be understood that the above-described skewing of the cutting edges of the cutting blocks is not necessary even when editing conventionally recorded video tape and/or may be at some different angle, for example, than that given above, depending upon the method and manner by which the signals are recorded on the magnetic tape to be edited and spliced by the apparatus embodying my invention.

In operation of the editing apparatus embodying my invention and described above, it is necessary to employ means for sensibly indicating the electric signals induced by the magnetically recorded edit pulses in the electromagnetic element 62 of rotating playback heads 61. For this purpose, I prefer to employ a conventional cathode ray oscilloscope whose operation and function are well known and, therefore, need not be shown or described. If necessary, amplifiers may be provided to amplify the signal induced in the playback heads before it is fed to the oscilloscope. The output of the two rotating heads or amplifiers if used, are fed to the vertical input of the oscilloscope. The horizontal sweep on the oscilloscope is set for internal sweep. When a piece of magnetic tape with a control track recorded thereon is placed flat in the guideway of one of the pulse sensing elements so that an edit pulse recorded therein overlies the slot in the guideway and is exposed to the rotating playback head therein, a pulse signal will be induced in the electromagnetic element of the rotating playback head and will appear as a pulse on the oscilloscope. The trace on the oscilloscope will have its greatest amplitude if the recorded edit pulse on the tape is positioned directly above the shaft of the rotating playback head or at the point of tangency of the tape and playback head so that it comes into closest proximity possible with the electromagnetic element therein and thereby induces the maximum current. When a piece of tape overlies each rotating playback head and their inputs are both fed to the vertical sweep of the oscilloscope, both edit pulses will produce a trace on the scope. By maintaining the two rotating playback heads in mechanical phase with each other, i.e. so that an electromagnetic element in the periphery of each is simultaneously located at the top side of the playback heads or at the point of tangency with the tape and in the closest relationship possible with the overlying tape, the two electrical signals from the heads will occur simultaneously if an edit pulse is located at each of the tangent positions of the tape and the rotating playback heads. In addition, the traces produced on the oscilloscope by the signals induced in each of the playback heads will be superimposed on the oscilloscope screen and be of substantially comparable amplitude. When an edit pulse on the tape is moved relative to one playback head so that it is displaced from a tangent or maximum signal position, the trace on the oscilloscope will show two edit pulses, one displaced horizontally from the other and of lesser amplitude because a full signal is not induced in the playback head reading the displaced edit pulse.

From the foregoing, it will be apparent that the editing apparatus described above, including the two rotating playback heads positioned to read and have signals induced in them by prerecorded edit pulses on magnetic tape, is able to provide a sensible indication of the location of each of two otherwise invisible edit pulses recorded on magnetic tape with respect to a sensible reference location and thus with respect to each other. Given this capability, it is necessary then to properly relate the physical dimensions between two sensible reference locations, i.e. the tangency points with respect to a piece of tape of the two rotating playback heads, to each other and to the spacing of the edit pulses in a prerecorded control track of magnetic tape to be edited.

Upon undertaking to splice together two pieces of magnetic tape having a control track recorded therein, it is necessary to calibrate the apparatus for the spacing between the edit pulses of the prerecorded control track. This is accomplished by taking a continous and complete length of reprecorded tape to be spliced and laying it longitudinally across the length of the apparatus and within guideways 43 variously located therealong. All clamping bars 54 and plates 66 and 72 and cutter bar 76 and its clamping plate 75 should be raised from a clamping position and swung upwardly and rearwardly out of the way. A continuous length of tape is placed across the full length of the apparatus and in guideways 43 and synchronous motor 60 on right-hand pulse sensing element 16, for example, is turned on. The output of right-hand playback head 61 is supplied to the vertical deflection of a cathode ray oscilloscope. The continuous length of tape is then shifted longitudinally until an edit pulse is detected in the region of right-hand rotating playback head 61 by observation of its induced trace on the oscilloscope screen. Next, clamping bar 54 of right-hand tape positioner 17 is swung down into its clamped position with its pressure pad 56 resiliently urging and holding the tape against upper surface 45. With the tape clamped at this single point along its length, right-hand tape positioner element 17 is moved back and forth with respect to pulse sensing element 16 by operation of knurled knob 51 turning adjusting screw 50 until a pulse trace of maximum amplitude is observed in the scope indicating that an edit pulse in the clamped tape is vertically above the shaft of rotating playback head 61 and in a position of tangency and closest proximity therewith. At this time, clamping plate 72 on right-hand tape holder 15 is lowered into a clamping position insuring the tape against movement from this location.

The left-hand motor 60 of left-hand pulse sensing element 13 is next turned on with the output of its associated playback head 61 also connected to the vertical input of the oscilloscope. When an edit pulse is within a detectable distance from its full-strength signal-inducing or tangent position directly above the shaft of left-hand rotating playback head 61 and in closest proximity to electromagnetic element 62 rotating therein, a pulse trace will appear on the oscilloscope slightly displaced from the full-strength trace produced thereon by the right-hand rotating playback head 61 and of slightly lesser amplitude. By operation of adjusting screw 41 appearing in the left-hand bed end plate 42 and upon loosening clamping studs 31, left-hand pulse sensing element 13 is moved back and forth until the edit pulse trace produced by its playback head 61 is superimposed upon the trace produced by right-hand playback head 61 indicating that an edit pulse on the continuous piece of tape vertically overlies the shaft of left-hand rotating playback head 61 at the point of tangency of the tape and playback head. When left-hand pulse sensing element 13 has been so located, clamping studs 31 thereof are tightened into clamping engagement with the supporting and guiding bed 11.

By the operations described above, the two pulse sensing elements 13 and 16 are so positioned with respect to each other that the distance between the two verticals passing through the centers of their rotating playback heads is equal to a whole number multiple of the spacing between the prerecorded edit pulses on the continuous piece of magnetic tape.

Having so positioned the rotating playback head mounted in the pulse sensing elements 13 and 16 with respect to each other, splicing operation may be undertaken. The first section of program tape to be spliced is viewed on a video tape machine and cut at the end of a scene or at any point therein desired. It will be noted that while the tape may be cut approximately at a point desired and as indicated by the video tape machine, it is not possible to cut the tape precisely with respect to the invisible edit pulses and the control track recorded thereon. This first section of program tape is then placed in guideways 43 of the left-hand portion of the editing apparatus with clamping bar 54 of left-hand tape positioner 12 in clamping engagement therewith. Left-hand motor 60 is turned on and tape positioner 12 is moved back and forth relative to pulse sensing element 13 until the tape is positioned for maximum amplitude display on the oscilloscope of an invisible edit pulse recorded on the tape. This first section of program tape is then clamped in this position by means of clamping plate 66 on left-hand tape holder and cutting edge element 14 and the left-hand playback head and motor 61 and 60, respectively, turned off.

The next section of program tape to be spliced to the first is viewed on a video tape machine and the desired point therein to be spliced to the first section is approximately located. The end of this section of program tape to be spliced to the first section is then clamped in right-hand tape positioner 17 and the right-hand playback head and motor 61 and 60, respectively, turned on with the output of the playback head connected to the vertical sweep of the oscilloscope. This second section of program tape is moved longitudinally by the adjusting means associated with right-hand tape positioner element 17 until a trace of an invisible edit pulse recorded on the tape appears on the oscilloscope screen. The left-hand playback head and the motor 61 and 60, respectively, are next turned on and the second or right-hand section of program tape moved longitudinally again until the traces produced by the left-hand playback head and the right-hand playback head coincide on the oscilloscope. The sensible display produced on the oscilloscope thus corresponds to or matches the sensible display produced thereon by the two rotating playback heads when the two pulse sensing elements 13 and 16 were positioned with respect to each other by means of a continuous piece of tape as described above. Next, clamping plate 66 of right-hand tape holder 15 is lowered to a clamping position and the left-hand and right-hand playback heads and motors are turned off.

At this point, the two pieces of program tape to be spliced are located and positioned longitudinally with respect to each other so that any particular edit pulse recorded on one piece of tape is a whole number multiple of the edit pulse spacing from any edit pulse prerecorded on the other piece of program tape.

Cutter bar 76 is now operated, cutting both left and right sections of tape. Since the movable cutter block 79 on cutter bar 76 is equal in width to the space between two edit pulses in the prerecorded control track of the tape being spliced or at least equal to a whole number multiple of the edit pulse spacing, it will be apparent that the two sheared ends of the two pieces of tape are spaced apart some whole number multiple of the edit pulse spacing in the prerecorded control track on the tapes. Therefore, bringing and abutting together the two sheared ends of the two pieces of tape will shorten the spacing between any two particular pulses on the two tapes but will maintain their relative spacing at a whole number multiple of edit pulse spaces therebetween.

The two sheared ends of the tape are abutted together in preparation for splicing by means of pressure-sensitive tape or any other suitable means by releasing the eccentric cam 36 from engagement with the top side of tenon 21 by operation of handle 37 and unclamping the first or left-hand section of program tape from left-hand tape positioner element 12 while maintaining clamping plate 66 in its clamping position on left-hand tape holder and cutting edge element 14. Left-hand tape holder and cutting edge element 14 can now be longitudinal displaced along supporting and guiding bed 11 toward and into engagement with the side face of right-hand tape holder and cutting edge element 15 so that the two sheared ends of the pieces of tape positioned in the left- and right-hand parts of the editing apparatus butt together with the control track spacing and pattern related in a continuous fashion across the splice.

It is desirable, though not necessary, that the left-hand edge of stationary cutting block 70 in right-hand tape holder and cutting edge element 15 and, therefore, also the cooperating shearing surface of movable cutting block 79 on cutter bar 76 be positioned a whole number multiple of edit pulse spaces from the vertical through the center of rotating playback head 61 in the right-hand pulse sensing element 16. By so doing, the above-described method of splicing the tape and operating the apparatus embodying my invention will result in the splices being made with great precision at an edit pulse. Such a relationship between stationary cutting block 70 and right-hand playback head 61 is not necessary, however, because regardless of the spacing between these two elements, the edit pulses on the two pieces of tape to be spliced are set up in the apparatus and with respect to each other so that the pattern of edit pulse spacing is maintained from one to the other and, if movable cutting block 79 on cutter bar 76 has a width equal to one or more edit pulse spaces, this relationship between the edit pulse spacing of the two tapes will be maintained regardless of the point along the control track that is sheared by operation of cutter bar 76.

Changes, modifications and improvements may be made to the above-described preferred form of my invention without departing from the precepts and principles of the invention. Therefore, I do not wish my patent to be limited to the particular form of my invention specifically illustrated and described nor in any manner inconsistent with the extent to which my invention has promoted the art.

I claim:

1. A method for longitudinally positioning with respect to each other two longitudinally aligned pieces of magnetic tape, each having a plurality of magnetically recorded invisible signal pulses uniformly spaced along its length at the same predetermined interval as the signals on the other so that the pattern of signal pulse spacing is maintained from one of said pieces of tape to the other and comprising the steps of (1) providing by a pair of spaced apart electromagnetic sensing and indicating means an electrically produced and enlarged, visible display of two of a plurality of uniformly spaced invisible signal pulses magnetically recorded on one of said pieces of tape remote from the tape, (2) providing simultaneously by the same pair of spaced apart electromagnetic means an electrically produced and enlarged, visible display of one of a plurality of uniformly spaced invisible signal pulses magnetically recorded on each of said pieces of tape, remote from the tape, and (3) longitudinally displacing one of said pieces of tape with respect to the other so that the visible display provided in step (2) corresponds to the visible display provided in step (1).

2. An apparatus for trimming for splicing together two longitudinally aligned pieces of magnetic tape, each having a control track including a plurality of magnetically recorded invisible signal pulses uniformly spaced along its length at the same predetermined interval as the signals on the other so that the pattern of signal pulse spacing is maintained across the splice and from one of said pieces of tape to the other comprising a pair of spaced apart electromagnetic sensing means for sensing and providing electrical indications of the presence of invisible signal pulses magnetically recorded on tape at a pair of reference locations with respect to said means, said pair of spaced apart electromagnetic sensing means being spaced apart so that their related reference locations are a whole number multiple of the space between two adjacent signal pulses recorded on the pieces of tape to be positioned, shearing means having cutting edges lying normal to a line extending through both of said reference locations and interposed said reference locations.

3. An apparatus for trimming for splicing together two longitudinally aligned pieces of magnetic tape, each having a control track including a plurality of magnetically recorded invisible signal pulses uniformly spaced along its length at the same predetermined interval as the signals on the other so that the pattern of signal pulse spacing is maintained across the splice and from one of said pieces of tape to the other comprising a longitudinally extending guideway having a plane bottom for receiving the adjacent and overlapping ends of two pieces of tape to be spliced in longitudinal alignment therealong, a pair of slots in said guideway bottom longitudinally extending and spaced apart therealong and transversely spaced of said guideway bottom oppositely only the track of signal pulses on said tapes, a pair of motor-driven circular rotating electromagnetic playback heads spaced apart a whole number multiple of the space between adjacent signal pulses on the tape to be spliced along the length of said guideway adjacent said slots and mounted for rotation about axes transverse to the longitudinal axis of said guideway and parallel to and below the plane of said guideway bottom with the circular periphery of each of said playback heads appearing in one of said slots and tangent to the plane of said guideway bottom, shearing means having cutting edges lying transversely of said guideway and interposed said pair of rotating playback heads.

4. The apparatus according to claim 3 in which said shearing means comprises a pair of laterally spaced apart stationary cutting edges flush with said guideway bottom and a movable double-edged cutting block mounted for shearing engagement of one of its cutting edges with one of said stationary cutting edges and the other of its cutting edges with the other of said stationary cutting edges, said space between said pair of stationary cutting edges being a whole number multiple of the space between two adjacent signal pulses on the tape to be spliced together by said apparatus.

5. The apparatus according to claim 4 in which one of said stationary cutting edges in spaced from the point of tangency of one of said rotating playback heads with said guideway a whole number multiple of the space between two signal pulses on the tape to be spliced.

6. The apparatus according to claim 2 in which said shearing means comprises a pair of laterally spaced apart stationary cutting edges and a movable double-edged cutting block mounted for shearing engagement of one of its cutting edges with one of said stationary cutting edges and the other of its cutting edges with the other of said stationary cutting edges, said space between said pair of stationary cutting edges being a whole number multiple of the space between two adjacent signal pulses recorded on the tape to be spliced together by said apparatus.

7. The apparatus according to claim 6 in which one of said stationary cutting edges is spaced from one of said reference locations a whole number multiple of the space between two adjacent signal pulses on the tape to be spliced.

8. A method for longitudinally positioning with respect to each other two longitudinally aligned pieces of magnetic tape, each having a plurality of magnetically recorded invisible signal pulses uniformly spaced along its length at the same predetermined interval as the signals on the other so that the pattern of signal pulse spacing is maintained from one of said pieces of tape to the other and comprising the steps of (1) deriving an electric signal proportional to the proximity of one of the invisible signal pulses magnetically recorded on one of said pieces of tape to one reference location, and an electrical signal proportional to the proximity of another of the invisible signal pulses magnetically recorded on the same one of said pieces of tape to another reference location spaced from the other, (2) deriving simultaneously an electric signal proportional to the proximity of an invisible signal pulse magnetically recorded on one of the two pieces of magnetic tape to be positioned to one of the reference locations in step (1) and an electrical signal proportional to the proximity of an invisible signal pulse magnetically recorded on the other piece of magnetic tape to be positioned to the other of the reference locations in steps (1), and (3) longitudinally displacing the pieces of tape with respect to each other so that the electrical signals derived in step (2) correspond to the electrical signals derived in step (1) and the ends of the two pieces of tape overlap between the two reference locations.

9. A method for trimming for splicing together two longitudinally aligned pieces of magnetic tape, each having a control track including a plurality of magnetically recorded invisible signal pulses uniformly spaced along its length at the same predetermined interval as the signals on the other so that the pattern of signal pulse spacing is maintained across the splice and from one of said pieces of tape to the other comprising the steps of (1) deriving an electric signal proportional to the proximity of one of the invisible signal pulses magnetically recorded on one of said pieces of tape to one reference location, and an electrical signal proportional to the proximity of another of the invisible signal pulses magnetically recorded on the same one of said pieces of tape to another reference location spaced from the other, (2) deriving simultaneously an electrical signal proportional to the proximity of an invisible signal pulse magnetically recorded on one of the two pieces of magnetic tape to be positioned to one of the reference locations in step (1) and an electrical signal proportional to the proximity of an invisible signal pulse magnetically recorded on the other piece of magnetic tape to be positioned to the other of the reference locations in steps (1), and (3) longitudinally displacing the pieces of tape with respect to each other so that the electrical signals derived in step (2) correspond to the electrical signals derived in step (1) and the ends of the two pieces of tape overlap between the two reference locations, (4) transversely cutting across and through both of said overlapped tape ends along two parallel lines spaced apart a whole number multiple of the space between two adjacent ones of said signal pulses on the tape being edited, and (5) bringing together in abutting relationship the adjacent cut ends of said two pieces of tape.

10. An apparatus for trimming for splicing together two longitudinally aligned pieces of magnetic tape, each having a control track including a plurality of magnetically recorded invisible signal pulses uniformly spaced along its length at the same predetermined interval as the signals on the other so that the pattern of signal pulse spacing is maintained across the splice and from one of said pieces of tape to the other comprising a pair of electromagnetic sensing means for sensing and providing electrical indications of the presence of invisible signal pulses magnetically recorded on tape at a pair of reference locations with respect to said means, said pair of electromagnetic sensing means being spaced apart so that their related reference locations are a whole number multiple of the space between two adjacent signal pulses recorded on the pieces of tape to be positioned.

References Cited by the Examiner

UNITED STATES PATENTS 3,050,105 8/1962 Dolby -------------- 178—6.6

DAVID G. REDINBAUGH, *Primary Examiner.*

HOWARD W. BRITTON, *Assistant Examiner.*